United States Patent [19]
Hoda

[11] 4,390,634
[45] Jun. 28, 1983

[54] CALCIUM FLUOROPHLOGOPITE GLASS-CERAMICS

[75] Inventor: Syed N. Hoda, Horseheads, N.Y.

[73] Assignee: Corning Glass Works, Corning, N.Y.

[21] Appl. No.: 349,001

[22] Filed: Feb. 16, 1982

[51] Int. Cl.³ .............................................. C03C 3/22
[52] U.S. Cl. ....................................................... 501/3
[58] Field of Search ........................................... 501/3

[56] References Cited

U.S. PATENT DOCUMENTS

| | | | |
|---|---|---|---|
| 3,689,293 | 9/1972 | Beall ........................................ | 501/3 |
| 3,756,838 | 9/1973 | Beall ........................................ | 501/3 |
| 4,118,237 | 10/1978 | Beall et al. .............................. | 501/3 |

*Primary Examiner*—Mark Bell
*Attorney, Agent, or Firm*—C. S. Janes, Jr.

[57] ABSTRACT

The instant invention is directed toward the production of an alkali metal-free glass-ceramic body wherein the predominant, and preferably sole, crystal phase is a calcium fluorophlogopite. The body is strong, chemically durable, exhibits excellent electrical properties, and has a base composition consisting essentially, expressed in weight percent on the oxide basis, of about CaO: 5–20
MgO: 15–25
$Al_2O_3$: 5–20
$SiO_2$: 35–60
F: 5–15 which is nucleated with 0.5–3.5% BaO+SrO, consisting of 0–3.5% BaO and 0–2.5% SrO, or, if BaO and/or SrO are absent, with 8–15% $TiO_2$. The preferred products exhibit a white, translucent appearance and excellent resistance to staining.

3 Claims, No Drawings

CALCIUM FLUOROPHLOGOPITE GLASS-CERAMICS

BACKGROUND OF THE INVENTION

The production of glass-ceramic articles containing synthetic micas as the predominant crystal phase is well known to the art. Hence, whereas naturally occurring micas are typically hydroxyl silicates, micas formed synthetically have customarily involved replacing the hydroxyl group within the crystal lattice with fluorine. Those crystals, often termed fluormicas, have been developed in glass-ceramic articles and, although such fine-grained, polycrystalline articles do not exhibit the single crystal capability of flexibility, they can, however, demonstrate excellent dielectric properties, thermal stability, and mechanical machinability.

In general, the structure of fluormica has been deemed to be defined by the postulated structural formula $X_{0.5-1}Y_{2-3}Z_4O_{10}F_2$, wherein X designates cations of relatively large size, i.e., having an ionic radius of about 1.0–1.6 Å, Y represents somewhat smaller cations, i.e., having an ionic radius of about 0.6–0.9 Å, and Z signifies small cations, i.e., having an ionic radius of about 0.3–0.5 Å, which coordinate to four oxygens. In general, the X cations will normally be potassium, but other large alkali metal ions such as $Na^+$, $Rb^+$, and $Cs^+$ and, more rarely, alkaline earth metal ions such as $Ca^{+2}$, $Sr^{+2}$, and $Ba^{+2}$ may be substituted in whole or in part for the potassium ions. The Y cations will commonly be selected from the group of $Mg^{+2}$, $Li^+$, and $Al^{+3}$ ions, and the Z cations will be selected from the group of $Si^{+4}$, $Al^{+3}$, and $B^{+3}$.

The development of glass-ceramic bodies capable of being shaped utilizing hand and machine tools was disclosed in U.S. Pat. No. 3,689,293. Those mechanically machinable glass-ceramic bodies contained synthetic fluormica crystals and consisted essentially, expressed in terms of weight percent on the oxide basis, of about 25–60% $SiO_2$, 15–35% $R_2O_3$, wherein $R_2O_3$ consists of 3–15% $B_2O_3$ and 5–25% $Al_2O_3$, 2–20% $R_2O$, wherein $R_2O$ consists of 0–15% $Na_2O$, 0–15% $K_2O$, 0–15% $Rb_2O$, and 0–20% $Cs_2O$, 4–20% F, and 6–25% MgO+$Li_2O$, consisting of 4–25% MgO+0–7% $Li_2O$.

X-ray diffraction analyses of those products indicated that the basic mica structure consisted of a fluorophlogopite solid solution, this solid solution being posited to be encompassed within three components, viz., normal fluorophlogopite, $KMg_3AlSi_3O_{10}F_2$, boron fluorophlogopite, $KMg_3BSi_3O_{10}F_2$, and a subpotassic aluminous phlogopite thought to approximate $K_{0.5}Mg_2Al_{0.83}BSi_3O_{10}F_2$.

U.S. Pat. No. 3,756,838 describes the preparation of glass-ceramic articles wherein the predominant crystal glass is an alkali metal-free fluormica. The articles consist essentially, expressed in terms of weight percent on the oxide basis, of about 30–65% $SiO_2$, 5–26% $Al_2O_3$, 10–35% MgO, 3–30% RO, wherein RO consists of 3–30% SrO and 0–25% BaO, and 3–15% F. The patent notes that up to several percent individually of a number of metal oxides may optionally be included, but the total of all such additions will not exceed 10% by weight. Those additions were selected from the group of $As_2O_3$, $B_2O_3$, BeO, CaO, $Fe_2O_3$, $La_2O_3$, MnO, PbO, $P_2O_5$, $Sb_2O_3$, $SnO_2$, $TiO_2$, ZnO, and $ZrO_2$. $K_2O$, $Rb_2O$ and $Cs_2O$ will be avoided because of their ready substitution for BaO and SrO.

The products are mechanically machinable and contain fluormica solid solutions varying over the range of $RMg_{2.5}AlSi_3O_{10}F_2$ and $R_{0.5}MgAlSi_3O_{10}F_2$. It was observed that the presence of $Sr^{+2}$ ions was necessary in the initial batch to stabilize precursor glass formations. Thus, the complete substitution of $Ba^{+2}$ ions for $Sr^{+2}$ ions causes the melt to quickly and spontaneously devitrify as it is being cooled. Where less than 5% BaO is included in the compositions, the glass-ceramic bodies swell when contacted with water, leading to subsequent disintegration. Moreover, $Sr^{+2}$-containing fluormicas and their intermediates with $Ba^{+2}$ additions are quite prone to develop cracks as the precursor glass body is crystallized in situ during heat treatment thereof. Thus, the articles almost invariably develop concentric cracks, the origin of which is not well understood. A study of the crystallization process at progressive stages has augured the hypothesis that a crystallizing front advances from the side of the glass body toward the center, causing the concentric cracks to appear due to density differences between the mica crystals and the residual glass.

Yet, because of the absence of alkali metals from the compositions, the electrical properties of the alkaline earth metal fluormica glass-ceramics are far superior to those glass-ceramics containing "conventional" fluorophlogopite crystals. Furthermore, the mechanical strengths of the alkaline earth metal fluormica glass-ceramics appear to be consistently greater than those demonstrated by those glass-ceramics containing alkali metal fluormicas.

OBJECTIVES OF THE INVENTION

The primary objective of the present invention is to provide an essentially alkali metal-free, alkaline earth metal-containing fluormica glass-ceramic body which is highly crystalline, is machinable with hand and machine tools, and exhibits high mechanical strength, good resistance to attack by acids and alkalies, and excellent dielectric properties.

Another objective is to provide a method for preparing such a glass-ceramic body.

A specific objective is to provide such a glass-ceramic body wherein the crystals are very fine-grained such that the body exhibits a white, translucent appearance and excellent resistance to staining such as to be aesthetically pleasing and of practical utility in dental restorations.

SUMMARY OF THE INVENTION

Those objectives can be achieved in a highly crystalline, glass-ceramic article wherein the predominant, and most preferably essentially the sole, crystal phase is a calcium fluorophlogopite. Thus, the inventive glass-ceramic article will be substantially alkali metal-free and have an overall base composition, expressed in terms of weight percent on the oxide basis, of about 35–60% $SiO_2$, 5–20% $Al_2O_3$, 15–35% MgO, 5–20% CaO, and 5–15% F which is nucleated with 0.5–4.0% SrO+BaO, consisting of 0–3.0% SrO and 0–4.0% BaO, or, if SrO and/or BaO are absent, with 8–15% $TiO_2$.

In preparing the inventive article, a batch of the necessary ingredients to produce a parent glass of a desired composition is melted, the melt is simultaneously cooled to a temperature at least within the transformation range and a glass article of a desired configuration shaped therefrom, and the glass article is exposed to temperatures within the interval of 800°–1100° C. for a sufficient period of time to effect crystallization in situ within the articles. The transformation range has been defined as that temperature at which a liquid melt is deemed to have been converted into an amorphous solid, that temperature customarily being considered to lie in the vicinity of the annealing point of the glass. Where desired, the precursor glass article may be cooled to room temperature for inspection prior to being heat treated to develop crystallization therein. Because the crystallization heat treatment is time and temperature dependent, only brief dwell periods will be required at the upper extreme of the temperature range, e.g., 0.25 hour; whereas, at temperatures near the lower end of the range, much longer exposure periods may be necessary to promote high crystallinity, e.g., 24 hours and more.

The preferred heat treatment practice comprehends a two-step process. Hence, the parent glass article is first heated to a temperature somewhat above the transformation range thereof, viz., about 600°–700° C., and held within that temperature zone for a period of time sufficient to insure substantial nucleation and initiate incipient crystal development. Thereafter, the nucleated glass article is heated to a temperature between about 1000°–1100° C. and maintained within that interval for a sufficient length of time to generate growth of crystals on the nuclei and achieve high crystallinity.

A glass prepared from a composition having the approximate stoichimetry of calcium fluorophlogopite is extremely stable against devitrification. Thus, the glass does not nucleate internally and, upon heating to temperatures approaching the softening point of the glass for extended periods of time, crystallization begins at the surfaces of the glass article and grows inwardly in an oriented fashion to meet at the center of the article.

The stability of the glass is such that an addition of at least 8% $TiO_2$ and, most preferably, at least 10% $TiO_2$ is demanded to provide satisfactory nucleation. The incorporation of such large quantities of $TiO_2$ leads to the growth of rutile crystals in the final product which dilute the desired physical properties inherently imparted via the calcium fluorophlogopite crystals. However, the inclusion of only about 0.5% BaO and/or SrO is adequate to yield well-nucleated, translucent, fine-grained, highly crystalline glass-ceramic bodies. Accordingly, the preferred products utilize BaO and/or SrO nucleation.

In the BaO and/or SrO nucleated products, the crystallization, as investigated via X-ray diffraction analyses, consisted of essentially a single phase, viz., calcium fluorophlogopite. The crystals exhibited an aspect ratio of about 1:2, as viewed utilizing replica electron microscope techniques. X-ray diffraction patterns and electron microscope examinations determined the essential absence of any secondary crystal phase and the amount of residual glass was estimated to not exceed about 10% by volume.

Where heat treating temperatures in excess of 1100° C. are used, partial melting and crystallization of the fluormica phase take place. Hence, the total crystal content decreases significantly with a consequent substantial increase in glass phase, and X-ray diffraction analyses identified the substantial presence of norbergite crystals ($Mg_2SiO_4 \cdot MgF_2$).

DESCRIPTION OF PREFERRED EMBODIMENTS

Table I reports a number of glass compositions, expressed in terms of parts by weight on the oxide basis, which, when heat treated in accordance with the parameters of this inventive method, were crystallized in situ to relatively highly crystalline, glass-ceramic bodies. The actual batch ingredients may comprise any materials, either the oxides or other compounds, which, when melted together, will be converted into the desired oxide in the proper proportions. Because it is not known with which cation(s) the fluoride is combined, it is simply reported as $MgF_2$, the batch ingredient utilized to supply the fluoride. It will be appreciated, of course, that other fluoride compounds, e.g., $AlF_3$, can be employed to furnish the desired fluoride content. Inasmuch as the sum of the individual constituents totals or approximately totals 100, for all practical purposes the values recited in Table I may be considered to reflect weight percent.

The batch materials were compounded, ballmilled together to assist in achieving a homogeneous melt, and thereafter melted in closed platinum crucibles for about 5 hours in a furnace operating at about 1450° C. The melts were poured into steel molds to form glass slabs having dimensions of about 6"×6"×0.5" and the slabs immediately transferred to an annealer operating at about 600° C. Visual observation of the slabs showed them to be essentially clear. Volatilization of fluoride from the melts was determined to be relatively low, i.e., less than about 15%.

TABLE I

|         | 1    | 2    | 3    | 4    | 5    | 6    |
|---------|------|------|------|------|------|------|
| $SiO_2$   | 44.0 | 43.6 | 43.5 | 42.4 | 41.4 | 40.5 |
| $Al_2O_3$ | 12.5 | 12.3 | 12.3 | 12.0 | 11.7 | 11.5 |
| MgO     | 18.7 | 18.6 | 18.5 | 18.1 | 17.8 | 17.3 |
| $MgF_2$   | 16.8 | 16.5 | 16.5 | 16.1 | 15.7 | 15.4 |
| CaO     | 5.6  | 5.6  | 6.8  | 6.6  | 6.5  | 6.3  |
| SrO     | 2.5  | —    | —    | —    | —    | —    |
| BaO     | —    | 3.4  | —    | —    | —    | —    |
| $TiO_2$   | —    | —    | 2.4  | 4.7  | 6.9  | 9.0  |

|         | 7    | 8    | 9    | 10   | 11   |
|---------|------|------|------|------|------|
| $SiO_2$   | 44.3 | 44.0 | 43.8 | 44.4 | 43.9 |
| $Al_2O_3$ | 12.6 | 12.5 | 12.4 | 12.6 | 12.5 |
| MgO     | 18.9 | 18.8 | 18.7 | 18.9 | 18.7 |
| $MgF_2$   | 16.8 | 16.7 | 16.6 | 16.8 | 16.7 |
| CaO     | 6.7  | 6.4  | 6.1  | 6.5  | 6.7  |
| SrO     | —    | —    | —    | 0.84 | —    |
| BaO     | 0.85 | 1.7  | 2.6  | —    | 1.7  |

After annealing and visual inspection for glass quality, the slabs were introduced into an electrically-fired furnace and subjected to the following heat treatment schedule: heated at about 5° C./minute to 625° C., maintained at that temperature for four hours, heated at about 5° C./minute to 1000° C., held at that temperature for four hours, and then cooled at furnace rate to room temperature. Cooling at furnace rate contemplates cutting off the electric current to the furnace and allowing the furnace to cool to room temperature with the crystallized article retained therewithin. This rate has been estimated to average 3°–5° C./minute.

Table II reports a visual description of the glass-ceramic body, the crystal phases present therein as identified through X-ray diffraction analyses, a qualitative appraisal of the mechanical strength of each article, and modulus of rupture values where measured. All of the crystallized bodies were translucent-to-opaque white and demonstrated excellent machinability.

TABLE II

| Example No. | Visual Description | Crystal Phases | Strength | Modulus of Rupture |
|---|---|---|---|---|
| 1 | Fine-grained, translucent | Fluormica | Fairly Strong | — |
| 2 | Fine-grained, translucent | Fluormica | Strong | 21,000 psi |
| 3 | Coarse-grained, opaque white | Fluormica + minor rutile | Quite Weak | — |
| 4 | Coarse-grained opaque white | Fluormica + rutile | Weak | — |
| 5 | Coarse-to-medium-grained, opaque white | Fluormica + rutile | Stronger than 4 | — |
| 6 | Medium-grained, opaque white | Fluormica + rutile | Stronger than 5 | 12,000 psi |
| 7 | Fine-grained, translucent | Fluormica | Rather Strong | 17,000 psi |
| 8 | Fine-grained, translucent | Fluormica | Strong | — |
| 9 | Fine-grained, translucent | Fluormica | Strong | — |
| 10 | Fine-grained, translucent | Fluormica | Strong | — |
| 11 | Fine-grained, translucent | Fluormica | Strong | — |

In Table II, the term "fine-grained" designated crystals having average diameters of less than about one micron. "Medium-grained" signifies crystal diameters in the range of about one to five microns. "Coarse-grained" indicates crystal diameters greater than about five microns. It will be observed that the translucency and strength of the crystallized articles are directly related to the size of the crystal, the coarser-grained bodies exhibiting lower strengths. The presence of coarse-grained crystals is due to poor nucleation. Hence, the need for at least about 8% $TiO_2$. A modulus of rupture at least 12,000 psi has been deemed a desirable minimum with levels in excess of 15,000 psi being much preferred.

Table III records a group of electrical property measurements conducted on samples of Example 9 crystallized in accordance with the heat treatment schedule employed for the products of Table II. Dielectric strengths in excess of 2 KV/mil were measured on samples of 10 mil (0.01″) thickness. As can be seen from Table III, electrical resistivities ($\rho$) varied from greater than 15 to less than 9 over a range of temperatures, and loss tangents (tan $\simeq$) and dielectric constants ($K^1$) ranged between 0.0001–0.005 and 6.77–6.90, respectively, over the interval of room temperature (25° C.) to 200° C. between frequencies of $10^2$–$10^5$ Hz.

TABLE III

| Temp °C. | Log $\rho$ | $10^2$Hz tan δ | $10^2$Hz $K^1$ | $10^3$Hz tan δ | $10^3$Hz $K^1$ | $10^4$Hz tan δ | $10^4$Hz $K^1$ | $10^5$Hz tan δ | $10^5$Hz $K^1$ |
|---|---|---|---|---|---|---|---|---|---|
| 25 | — | 0.001 | 6.80 | 0.0001 | 6.77 | 0.0004 | 6.77 | 0.0007 | 6.77 |
| 108 | 15.04 | 0.001 | 6.82 | 0.0002 | 6.80 | 0.0004 | 6.80 | 0.0005 | 6.80 |
| 197 | 13.29 | 0.005 | 6.90 | 0.0014 | 6.85 | 0.0008 | 6.84 | 0.0007 | 6.84 |
| 299 | 11.33 | 0.078 | 7.28 | 0.0203 | 6.99 | 0.0049 | 6.92 | 0.0017 | 6.90 |
| 398 | 9.93 | 0.561 | 9.88 | 0.1468 | 7.61 | 0.0364 | 7.13 | 0.0090 | 6.99 |
| 498 | 8.87 | 2.123 | 17.61 | 0.6280 | 10.14 | 0.1615 | 7.73 | 0.0400 | 7.20 |

To illustrate the resistance of the inventive materials to various reagents, standard chemical durability tests were conducted on samples of Example 10, crystallized in accordance with the heat treatment schedule reported for Table II above. The data are tabulated below in Table IV along with those demonstrated by MACOR ® brand material, an alkali metal-containing machinable glass-ceramic product marketed by Corning Glass Works, Corning, N.Y., under Code 9658, having a composition within U.S. Pat. No. 3,689,293, supra. The four reagents utilized were: (1) a 5% by weight aqueous solution of HCl; (2) distilled water; (3) a 0.02 N aqueous solution of $Na_2CO_3$; and (4) a 5% by weight aqueous solution of NaOH. Each liquid was at a temperature of 95° C. and the samples were immersed therein for 24 hours in the HCl solution, 24 hours in the distilled water, 6 hours in the $Na_2CO_3$ solution, and 6 hours in the NaOH solution. Weight loss of each sample is recorded in terms of $mg/cm^2$ and a visual description of each sample after removal from the liquid is provided.

TABLE IV

| | Example 10 Weight Loss | Example 10 Appearance | Code 9658 Weight Loss | Code 9658 Appearance |
|---|---|---|---|---|
| HCl | 79 | Chalky | 110 | Chalky |
| $H_2O$ | 0.01 | Yellow Specks | 0.01 | Chalky |
| $Na_2CO_3$ | 0.01 | No Change | 0.13 | Chalky |
| NaOH | 0.46 | No Change | 12 | Chalky |

As can be observed from the table, the alkali metal-free, alkaline earth metal-containing fluormica product exhibits chemical durability superior to that of the conventional alkali metal-containing fluorophlogopite glass-ceramics.

Finally, in contrast to strontium-containing fluormicas, the inventive calcium-containing fluorophlogopites do not swell when immersed into water. Also, contrary to the general experience with barium-containing fluormicas, the inventive materials do not develop cracks during the crystallization process.

The compositions demonstrating a preferred combination of high mechanical strength, exceptional resistance to attack by acids and alkalies, excellent dielectric properties, and very desirable white, translucent appearance are encompassed within the base ranges of 40-50% $SiO_2$, 10-15% $Al_2O_3$, 20-30% MgO, 5-10% CaO, and 5-10% F, with the most preferred base composition following the stoichiometric formula $Ca_{0.5}Mg_3AlSi_3O_{10}F_2$ which converts to the approximate weight percent of 44.9% $SiO_2$, 20.0% MgO, 15.4% $MgF_2$, 12.7% $Al_2O_3$, and 7.0% CaO.

I claim:

1. A glass-ceramic article which is machinable with hand and machine tools, exhibits high mechanical strength, good resistance to attack by acids and alkalies, excellent dielectric properties, and which does not swell when immersed into water nor develop cracks during the crystallization process having a base composition which is essentially free from alkali metal and which consists essentially, expressed in terms of weight percent on the oxide basis, of about 35-60% $SiO_2$, 5-20% $Al_2O_3$, 15-35% MgO, 5-20% CaO, and 5-15% F, which is nucleated with 0.5-4% SrO+BaO, consisting of 0-3.0% SrO and 0-4.0% BaO, or, if SrO and/or BaO are absent, with 8-15% $TiO_2$, said article containing not more than 10% by volume residual glass and wherein calcium fluorophlogopite is essentially the sole crystal phase when nucleated with 0.5-5.0% SrO+BaO and wherein calcium fluorophlogopite and a minor amount of rutile are essentially the sole crystal phases present when nucleated with 8-15% $TiO_2$.

2. A glass-ceramic article according to claim 1 having the base composition of:
   CaO: 5-10
   MgO: 20-30
   $Al_2O_3$: 10-15
   $SiO_2$: 40-50
   F: 5-10.

3. A glass-ceramic article according to claim 1 which is nucleated with BaO and/or SrO to be very fine-grained so as to exhibit a white, translucent appearance and excellent resistance to staining.

* * * * *